(12) United States Patent
Kühn et al.

(10) Patent No.: US 9,100,113 B2
(45) Date of Patent: Aug. 4, 2015

(54) AUTO-HETERODYNE RECEIVER

(75) Inventors: Silvio Kühn, Wandlitz (DE); Roland Gesche, Seligenstadt (DE)

(73) Assignee: FORSCHUNGSVERBUND BERLIN E.V., Berlin (DE)

( * ) Notice: Subject to any disclaimer, the term of this patent is extended or adjusted under 35 U.S.C. 154(b) by 61 days.

(21) Appl. No.: 14/114,452

(22) PCT Filed: Apr. 25, 2012

(86) PCT No.: PCT/EP2012/057537
§ 371 (c)(1),
(2), (4) Date: Dec. 11, 2013

(87) PCT Pub. No.: WO2012/146609
PCT Pub. Date: Nov. 1, 2012

(65) Prior Publication Data
US 2014/0120855 A1    May 1, 2014

(30) Foreign Application Priority Data

Apr. 26, 2011   (DE) .......................... 10 2011 017 645

(51) Int. Cl.
*H04B 17/00* (2015.01)
*G01S 5/04* (2006.01)
*H04B 17/21* (2015.01)
(Continued)

(52) U.S. Cl.
CPC ............ *H04B 17/0062* (2013.01); *H04B 17/21* (2015.01); *G01S 3/46* (2013.01); *G01S 3/48* (2013.01)

(58) Field of Classification Search
CPC ............... G01S 1/32; G01S 1/34; G01S 3/46; G01S 3/48; H04B 17/21; G01R 25/00

USPC ............ 455/90.2, 323, 324, 226.1, 132, 139, 455/67.11, 67.16; 342/442
See application file for complete search history.

(56) References Cited

U.S. PATENT DOCUMENTS 3,382,499 A * 5/1968 Baud .............................. 342/424
3,697,997 A * 10/1972 Cooper ......................... 342/413
(Continued)

FOREIGN PATENT DOCUMENTS

DE   102006043898   4/2008

OTHER PUBLICATIONS

International Search Report and the Written Opinion of the ISA mailed on Aug. 28, 2012 in PCT Application No. PCT/EP2012/057537. (10 pages).

*Primary Examiner* — Duc M Nguyen
(74) *Attorney, Agent, or Firm* — Novak Druce Connolly Bove + Quigg LLP

(57) ABSTRACT

A receiver with a local oscillator, a quadrature modulator, a first mixer and a second mixer, wherein a first input of the quadrature modulator is connected to a second signal input of the receiver circuit and a second input of the quadrature modulator is connected to the local oscillator. Further, a first input of the first mixer is connected to a first signal input of the receiver circuit, a second input of the first mixer is connected to an output of the quadrature modulator, and an output of the first mixer is connected to a first signal output of the receiver circuit. A first input of the second mixer is connected to the second signal input, a second input of the second mixer is connected to the output of the quadrature modulator, and an output of the second mixer is connected to a second signal output of the receiver circuit.

10 Claims, 2 Drawing Sheets

(51) Int. Cl.
    *G01S 3/48*      (2006.01)
    *G01S 3/46*      (2006.01)

(56) References Cited

U.S. PATENT DOCUMENTS

| | | | |
|---|---|---|---|
| 4,307,401 A * | 12/1981 | Glumov et al. | 342/421 |
| 5,257,284 A * | 10/1993 | Skudera et al. | 375/139 |
| 7,623,222 B2 * | 11/2009 | Benz et al. | 356/5.09 |
| 8,018,243 B2 | 9/2011 | Mann et al. | |
| 2004/0105087 A1 | 6/2004 | Goglla et al. | |
| 2005/0156780 A1 | 7/2005 | Bonthron et al. | |
| 2005/0225481 A1 | 10/2005 | Bonthron | |
| 2010/0207820 A1 | 8/2010 | Kawano et al. | |
| 2010/0303139 A1 * | 12/2010 | Arthaber | 375/224 |
| 2011/0092160 A1 | 4/2011 | Camp, Jr. et al. | |
| 2014/0236400 A1 * | 8/2014 | Zhang | 701/5 |

* cited by examiner

AUTO-HETERODYNE RECEIVER

CROSS-REFERENCE TO RELATED APPLICATIONS

This application is a §371 national phase filing of PCT/EP2012/057537 filed Apr. 25, 2012, which claims priority to and the benefit of DE 10 2011 017 545.8 filed Apr. 26, 2011, both of which are herein incorporated by reference in their entirety.

TECHNICAL FIELD

The invention relates to a receiver circuit and to a measuring device for measuring high-frequency signals with such a receiver circuit.

PRIOR ART

With high-frequency signals, an exact measuring of phase shifts is difficult in principle since a very high time resolution of the very short period of the high-frequency signals would be necessary therefor. In many applications, however, an exact measuring of the present phase shift is necessary, which is important, e.g., with respect to plasma generation for plasma-based processes, e.g., plasma etching or surface treatment, where the HF or microwave power outputted to the plasma load is to be measured for controlling the process parameters. However, such a plasma load may be very reactive so that the phase angle between current and voltage may be nearly 90°. In that case, reactive power is very high in relation to active power. However, the phase angle has to be measured very precisely in order to be able to calculate active power correctly since even the slightest errors of measurement have a superproportional effect on the determination of active power.

For such a task, a direct phase measurement by means of a monodyne receiver is not precise enough, which is why, e.g., heterodyne receivers or samplers are used for measurement. With such a heterodyne receiver, the measuring signals are mixed down to an intermediate frequency, where they can be subjected to further processing and, e.g., digitalized and evaluated numerically.

However, the limited stability of such a conversion is problematic. Moreover, the difficulty of conversion increases with an increasing original-frequency/intermediate-frequency ratio. Therefore, prior-art approaches do not allow particularly low intermediate frequencies in the high-frequency range provided for the invention. However, low intermediate frequencies, particularly below 25 kHz, advantageously allow a direct analog-digital conversion at the intermediate frequency by means of cheap audio hardware. Therefore, there is a demand for novel receiver structures that allow a precise determination of a phase angle. Aside from and independently of phase angle measurement, there may also be a demand for a measurement of the amplitudes or of ratios of amplitudes of high-frequency signals.

SUMMARY OF THE INVENTION

Therefore, a first aspect of the invention introduces a novel receiver circuit. The receiver circuit has a first signal input for a first input signal, a second signal input for a second input signal, a first signal output for a first output signal, and a second signal output for a second output signal. According to the invention, the receiver circuit also has a local oscillator, a quadrature modulator, a first mixer and a second mixer, wherein a first input of the quadrature modulator is connected to the first signal input and a second input of the quadrature modulator is connected to the local oscillator. In addition, a first input of the first mixer is connected to the first signal input, a second input of the first mixer is connected to an output of the quadrature modulator, and an output of the first mixer is connected to the first signal output. A first input of the second mixer is connected to the second signal input, a second input of the second mixer is connected to the output of the quadrature modulator, and an output of the second mixer is connected to the second signal output.

The receiver structure of the invention represents an auto-heterodyne receiver in which one of the input signals is transferred, together with the signal of the local oscillator, to a quadrature modulator and the output signal generated by the quadrature modulator is finally mixed with the two input signals, wherein the output signal of the quadrature modulator mainly includes spectral components whose frequencies are determined, depending on the sense of rotation of the complex local oscillator, by forming either the sum or the difference of/between the signal frequency and the frequency of the local oscillator. However, this output signal is subsequently mixed with the input signals of the arrangement again, which results in a further sum and difference formation with the signal frequency, wherein the signal frequency of the input signals of the receiver arrangement stands out in the lowest-frequency mixing product. Therefore, when mixed ideally, the two output signals of the receiver arrangement only have the intermediate frequency, wherein, however, the phase relation of the two input signals is maintained in the output signals so that the phase angle can now be determined at the intermediate frequency in a simple manner and with the desired accuracy. A further advantage consists in the fact that phase measurement will become independent of the actual and possibly fluctuating frequency of the measuring signals.

However, the receiver circuit of the invention may not only be used to measure the relative phase position of two signals or when measuring an active power but also for communication engineering applications. For example, a superposition of an amplitude-modulated signal and a phase- or frequency-modulated signal can be reversed. Since the frequency of an input signal does not appear at the output of the respective downstream mixer any more, frequency fluctuations can be eliminated. However, this means at the same time that the output signal of the mixer only exhibits amplitude variations. Thus, a piece of information encoded in the amplitude of the input signal can be separated from a piece of information encoded in the frequency or phase of the input signal. Moreover, the receiver circuit of the invention allows the determination of an amplitude of an input signal by measuring the output signals and inferring the input signals from the output signals by back-calculating.

Particularly preferably, the receiver circuit of claim 1 has a first analog-digital converter connected to the first signal output and a second analog-digital converter connected to the second signal output, whereby phase measurement evaluation is advantageously shifted to the digital domain and may be simply performed by, e.g., a digital signal processor (DSP).

The local oscillator is preferably designed to generate an oscillation having a frequency of less than 50 kHz, particularly preferably of less than 25 kHz. At these frequencies, cheap hardware may be used. Moreover, the relatively low frequencies facilitate the avoidance of reduced measuring accuracy on account of insufficient analog-digital conversion by oversampling.

In particular embodiments, the receiver circuit may have a control loop (e.g., phase-locked loop (PLL) or automatic frequency control (AFC)) designed to adjust the frequency of the local oscillator. Although the receiver circuit automatically compensates for frequency fluctuations of the input signals, frequency fluctuations of the local oscillator completely appear in the output signals of the receiver circuit. While a distortion of the measuring result can be prevented if fluctuations are small enough, a control of the frequency of the local oscillator is particularly advantageous with respect to applications in which the frequency of the local oscillator is so high that less expensive frequency synthesis methods (e.g., direct digital synthesis (DDS)) cannot be employed. Such an application may consist in directly down-mixing a transmitted signal (e.g., in a mobile network or a wireless data network) from one frequency band to another, wherein an advantage consists in the fact that the conversion from the original frequency band to the target frequency band can be performed with almost no latency, which would occur in the event of a usual reception of the transmitted data and subsequent modulation onto a new carrier signal.

In principle, however, any stable reference clock source may be used, such as an oscillation of a quartz-crystal oscillator, an oscillation derived from a quartz-crystal oscillator, or an oscillation generated by a digital-analog converter used, e.g., in a PC sound card.

If the output signal of the quadrature modulator has a predetermined amplitude, conclusions about the amplitudes of the input signals of the receiver circuit can be drawn on the basis of the amplitudes of the output signals of the first and second mixers so that a piece of amplitude information included in the input signals will not get lost. To this end, an amplitude normalization unit may be provided that may be connected between the output of the quadrature modulator and the second inputs of the first and second mixers. Alternatively, the amplitude normalization unit may be connected between the first signal input and the first input of the quadrature modulator if the amplitude of the signal of the local oscillator is known or at least constant (which is usually the case), wherein the amplitude normalization unit is designed to output an output signal having a predetermined amplitude, which can be achieved, e.g., by special amplifier components or limiters. Preferably, the amplitude normalization unit is designed as a control loop that determines a mean amplitude or power of either the output signal or the input signal of the amplitude normalization unit and adjusts a gain factor of an amplifier in such a manner that the amplifier generates on average an output signal having the desired predetermined amplitude, said amplifier being connected between the input and the output of the amplitude normalization unit. Such methods are known as automatic gain control (AGC).

The receiver circuit may have a transducer (e.g., a directional coupler or a measuring bridge) arranged upstream of the first and second signal inputs and designed to decouple a respective signal component of signals that are present at a first input and a second input of the transducer and to output said signal component to the first and second signal inputs of the receiver circuit.

The directional coupler is designed to put a forward wave on a selected signal input of the first or the second signal input of the receiver circuit and to put a backward wave on a remaining signal input of the first or the second signal input of the receiver circuit, whereby the phase angle and the absolute amplitudes of the input signals and thus the active power for a plasma-related application or another HF or microwave application can be determined. Alternatively, e.g., a voltage suitably divided by a voltage divider may be applied to the inputs of the receiver circuit.

A current transformer may be arranged upstream of a selected signal input of the first or the second signal input of the receiver circuit, said current transformer being designed to transform a current into a voltage. Preferably, the receiver circuit is designed to operate with voltage signals, which is why a current to be evaluated when measuring active power should be transformed into a voltage. In such a circuit arrangement, using a voltage divider at the remaining signal input of the receiver circuit would be advantageous since a voltage signal has to be evaluated as a second input signal when measuring active power.

Preferably, at least one of the first and second mixers has a low-pass filter at the output side, wherein it is the task of the low-pass filter to eliminate higher-frequency mixing products. Accordingly, fixing a limiting frequency of the low-pass filter/s of higher than or equal to the frequency of the local oscillator (intermediate frequency) is advantageous.

A second aspect of the invention introduces a measuring device for measuring a phase shift between a first HF signal and a second HF signal, wherein, according to the invention, a receiver circuit according to the first aspect of the invention and a phase measurement unit that is connected to the first and the second signal output of the receiver circuit are provided, wherein the phase measurement unit is designed to determine a phase shift between a first AF signal at the first signal output and a second AF signal at the second signal output.

The phase measurement unit may be designed according to any principle that is known in the prior art. It is essential for the invention that the receiver circuit according to the first aspect of the invention can convert two high-frequency input signals (e.g., microwave signals) to a lower frequency (an AF frequency) while maintaining the phase relation of the two input signals, wherein wow and flutter of the frequencies of the input signals are suppressed, thereby drastically reducing the circuitry demands made on the phase measurement unit.

EXEMPLARY EMBODIMENTS OF THE INVENTION

In the following, the invention will be explained in greater detail on the basis of two figures of exemplary embodiments.

Figure 1:
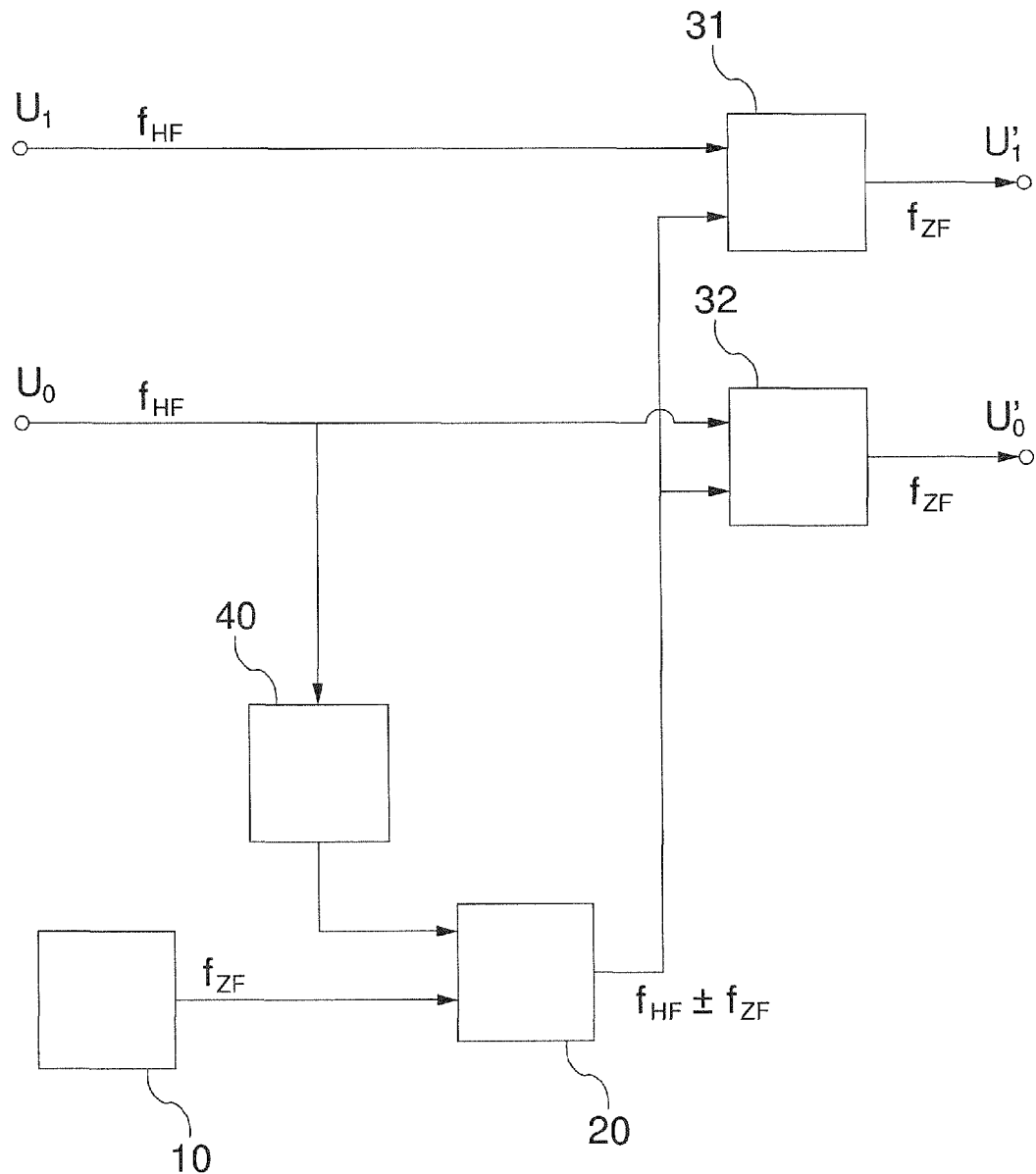
FIG. 1 shows a first exemplary embodiment of an inventive receiver circuit in the form of a block diagram.

FIG. 1 shows a first exemplary embodiment of an inventive receiver circuit in the form of a block diagram. Input signals $U_0$ and $U_1$ having a frequency $f_{HF}$ are present at two signal inputs of the receiver circuit. The two input signals may be two voltage signals, wherein one of the voltage signals is derived from a current that is operatively connected to the other voltage signal. An active-power/reactive-power ratio can then be determined by measuring the phase angle between the two input signals.

Any of the two input signals is transferred to an input of a quadrature modulator 20, wherein the selected input signal is advantageously led through an amplitude normalization unit 40 designed to amplify/damp the selected input signal up/down to a predetermined amplitude. An oscillation signal generated by a local oscillator 10 is transferred to the second input of the quadrature modulator 20. Said local oscillator 10 may have any design and just has to be suitable for generating a reference oscillation with an intermediate frequency. As is known, the output signal of the quadrature modulator 20 then particularly includes frequency components having a frequency of either $f_{HF}+f_{ZF}$ or $f_{HF}-f_{ZF}$, wherein the preceding sign of the combination depends on the sense of rotation of the local oscillator that is looked at in the complex plane. The signal generated by the quadrature modulator 20 is now mixed in two mixers 31 and 32 with a respective one of the two input signals $U_0$ and $U_1$, said mixing resulting in different modulation products. The lowest ones ($U_0'$ and $U_1'$) of said modulation products have a frequency $f_{ZF}$ on account of the renewed sum and difference formation with the frequency $f_{HF}$ of the input signals $U_0$ and $U_1$ so that the high frequency $f_{HF}$ of the input signals stands out, wherein, however, the phase relation of $U_0'$ and $U_1'$ is maintained and can now be evaluated by means of much simpler circuit means. The advantage of the amplitude normalization unit 40 consists in the fact that also the signal transferred to the corresponding inputs of the mixers 31 and 32 by the quadrature modulator 20 has a known and, in particular, constant amplitude so that conclusions about the amplitudes of the input signals can be drawn from the amplitudes of the output signals of the overall arrangement in a simple manner.

The paths extending from the signal inputs to the signal outputs may be referred to as channels, wherein the channel whose input signal $U_0$ also functions as the input signal of the quadrature modulator 20 may be considered as a reference channel. In general, the invention may be designed with any plurality of channels, wherein, however, only one reference channel is usually provided.

The receiver circuit of the invention is made up of standard components which can be simply realized for the frequencies to be required for the intended application. Thus, when performing a high-frequency excitation of, e.g., a plasma, active power can be measured in a cost-effective and precise manner.

Figure 2:
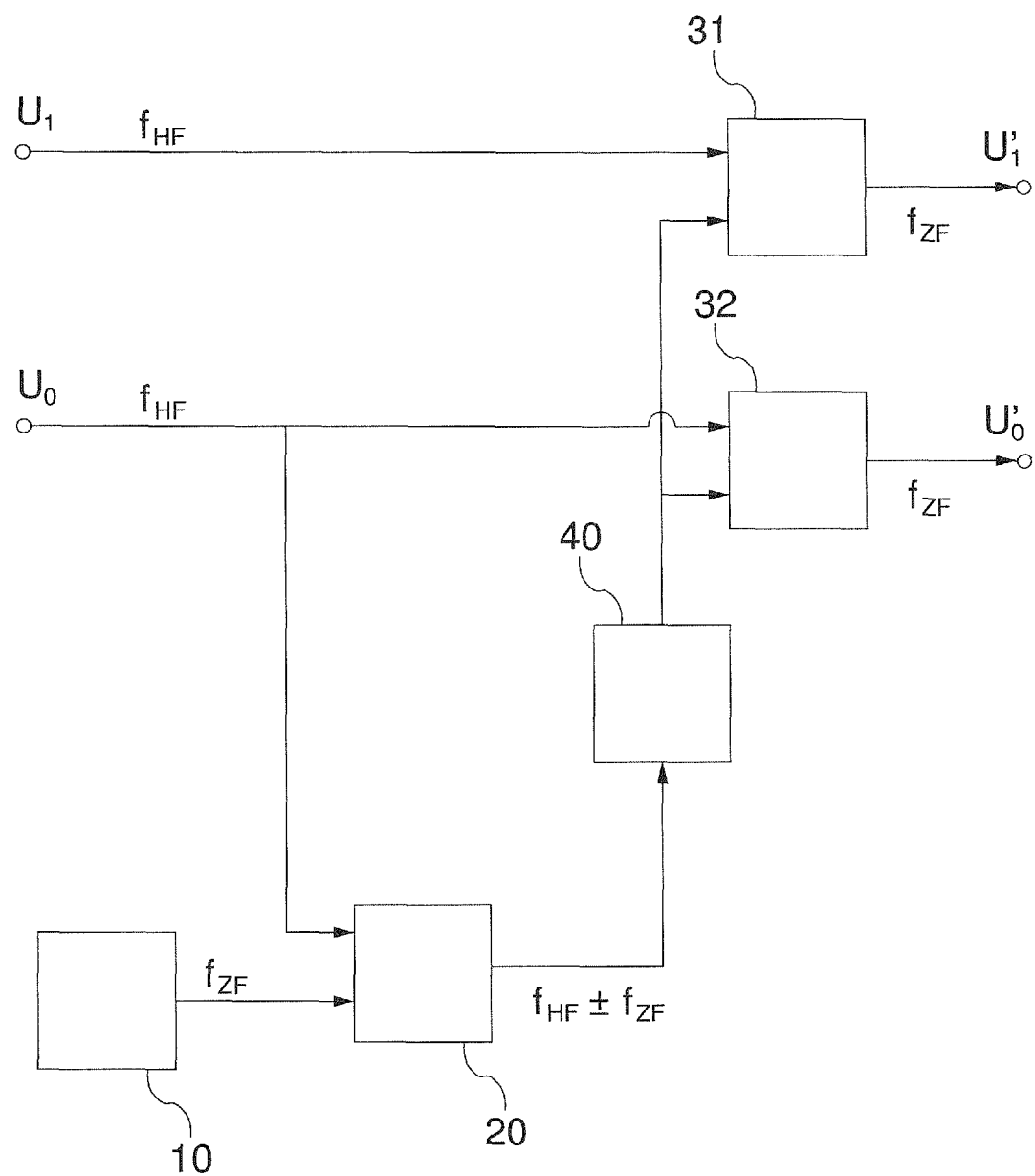
FIG. 2 shows a second exemplary embodiment of an inventive receiver circuit in the form of a block diagram.

FIG. 2 shows a second exemplary embodiment of an inventive receiver circuit in the form of a block diagram. The difference between the second exemplary embodiment and that of FIG. 1 consists in the alternative position of the amplitude normalization unit 40 in the second exemplary embodiment, where it is connected between the output of the quadrature modulator 20 and the corresponding inputs of the mixers 31 and 32, wherein amplitude fluctuations that are due to phase or amplitude errors of the complex local oscillator signal in the mixing by the quadrature modulator or may result from a non-ideality of the quadrature modulator itself can be compensated for by means of sufficiently fast amplitude control, thereby increasing the precision of the resulting output signal.

The invention claimed is:

1. A receiver circuit comprising a first signal input for a first input signal, a second signal input for a second input signal, a first signal output for a first output signal and a second signal output for a second output signal, characterized by a local oscillator, a quadrature modulator, a first mixer and a second mixer, wherein a first input of the quadrature modulator is connected to the first signal input and a second input of the quadrature modulator is connected to the local oscillator, wherein a first input of the first mixer is connected to the first signal input, a second input of the first mixer is connected to an output of the quadrature modulator and an output of the first mixer is connected to the first signal output, and wherein a first input of the second mixer is connected to the second signal input, a second input of the second mixer is connected to the output of the quadrature modulator and an output of the second mixer is connected to the second signal output.

2. The receiver circuit according to claim 1 further comprising a first analog-digital converter connected to the first signal output and a second analog-digital converter connected to the second signal output.

3. The receiver circuit according to claim 1, wherein the local oscillator is designed to generate an oscillation having a frequency of less than 50 kHz, preferably of less than 25 kHz.

4. The receiver circuit according to claim 1 further comprising a control loop wherein the control loop is designed to adjust the frequency of the local oscillator.

5. The receiver circuit according to claim 1 further comprising an amplitude normalization unit either connected between the first signal input and the quadrature modulator or connected between the quadrature modulator and the second inputs of the first and second mixers and designed to output an input signal having an unknown input amplitude as an output signal having a predetermined output amplitude.

6. The receiver circuit according to claim 1 further comprising a transducer arranged upstream of the first and second signal inputs and designed to decouple a respective signal component of signals that are present at a first input and a second input of the transducer and to output said signal component to the first and second signal inputs of the receiver circuit.

7. The receiver circuit according to claim 6, wherein the transducer is a directional coupler and designed to put a forward wave on a selected signal input of the first or the second signal input of the receiver circuit and to put a backward wave on a remaining signal input of the first or the second signal input of the receiver circuit.

8. The receiver circuit according to claim 1, wherein a current transformer is arranged upstream of a selected signal input of the first or the second signal input of the receiver circuit, said current transformer being designed to transform a current into a voltage.

9. The receiver circuit according to claim 1, wherein at least one of the first and second mixers has a low-pass filter at the output side.

10. A measuring device for measuring a phase shift between a first HF signal and a second HF signal, characterized by a receiver circuit according to any one of the preceding claims and a phase measurement unit that is connected to the first and the second signal output of the receiver circuit, said phase measurement unit being designed to determine a phase shift between a first AF signal at the first signal output and a second AF signal at the second signal output.

\* \* \* \* \*